DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 28, 1970

876 O.G. 815

T876,001
HEAT-RESISTANT POLYESTERS

Alan Bell and David W. Abee, both % P.O. Box 511, Kingsport, Tenn. 37662

Filed July 29, 1969, Ser. No. 845,874
Int. Cl. B29c *25/00;* C08g *17/00*
U.S. Cl. 260—75
No Drawing. 8 Pages Specification

A heat-resistant polyester film and method of making same is disclosed having the ability to withstand temperatures in the order of 250° C. The polyester film is made from a dicarboxylic acid comprising 80–100 mol percent terephthalic acid and 20–0 mol percent isophthalic acid, and 1,4-cyclohexanedimethanol having at least 60 percent trans isomer content. The film made from this polyester is first biaxially stretched such that the orientation is substantially balanced in the draft and tenter directions. The film is next heat treated at a temperature of at least 245° C. while restraining it from shrinkage. The film is then subjected to a second heat treating step while allowing it to relax, thereby allowing shrinkage.